United States Patent [19]

Minovitch

[11] 4,075,948

[45] Feb. 28, 1978

[54] RAPID TRANSIT SYSTEM

[76] Inventor: Michael A. Minovitch, 2832 St. George St., Apt. 6, Los Angeles, Calif. 90027

[21] Appl. No.: 438,230

[22] Filed: Jan. 31, 1974

[51] Int. Cl.² .......................................... B61B 13/10
[52] U.S. Cl. ....................... 104/138 R; 104/148 LM; 104/148 MS; 49/68
[58] Field of Search ............. 310/67 R; 104/148 MS, 104/138 R, 148 SS, 148 LM, 130, 148 CM; 74/572; 356/153, 172; 49/68

[56] References Cited

U.S. PATENT DOCUMENTS

| 432,615 | 7/1890 | Henning | 104/138 R |
|---|---|---|---|
| 1,336,732 | 4/1920 | Davy | 104/138 R |
| 2,511,979 | 6/1950 | Goddard | 104/138 R |
| 3,125,964 | 3/1964 | Silverman | 104/148 MS X |
| 3,404,638 | 10/1968 | Edwards | 104/138 R |
| 3,683,216 | 8/1972 | Post | 310/67 |
| 3,738,281 | 6/1973 | Waidelich et al. | 104/148 MS X |
| 3,763,788 | 10/1973 | Pougue | 104/138 R |
| 3,783,794 | 1/1974 | Gopfert et al. | 104/148 MS |

Primary Examiner—Stanley H. Tollberg
Assistant Examiner—Frederick R. Handren
Attorney, Agent, or Firm—Christie, Parker & Hale

[57] ABSTRACT

A rapid transit system in which a vehicle, typically consisting of a train of detachably coupled cars, is suspended in a vacuum tunnel with at least two sloping reaches from a ferromagnetic monorail of high resistivity by magnetic attraction and propelled by gravity. Servo-controlled electromagnets allow the vehicle to be suspended from the rail without actually being in contact with it or any other part of the tunnel. Propulsion by gravity from one station to the next is accomplished by allowing the vehicle to coast frictionlessly down one sloping reach of the tunnel during which time it is automatically accelerated, leveling off at the horizontal reach at some cruising depth where it coasts along at an essentially constant maximum speed, and then moving up the next sloping reach toward the second station during which time it is automatically decelerated, and finally stopping at the station where the original elevation is reached. When moving from one station to another station at a lower elevation, the excess kinetic energy is recovered by regenerative braking and stored in flywheel alternator-motor energy storage units to be used later in electric motors that enable the vehicle to move from one station to another station at a higher elevation, eventually returning to the original elevation.

25 Claims, 8 Drawing Figures

RAPID TRANSIT SYSTEM

BACKGROUND

Since the beginning of this century, the total amount of energy consumed in the United States for all forms of transportation has been taking an increasing percentage of the total annual energy production. In 1970, for example, transportation consumed approximately 29% of the total energy produced for that year. If the present trends continue, transportation energy consumption will overtake the total industrial consumption during the early part of the 1980's and will become the single largest consumer of energy. There are two fundamental reasons for these trends: (1) the desire for faster transportation vehicles and (2) an increasing population. For all practical purposes, the amount of energy expended in propelling a vehicle is directly proportional to the square of its operating speed. But the desire for higher transportation speeds appears to take precedence over all other factors — thus producing and accelerating the high transportation energy consumption.

At first glance, it may appear that these facts rest upon basic physical laws that cannot be circumvented. For example, accelerating a vehicle along an essentially level highway or railway to reach high speeds requires a large amount of energy. This energy is usually totally expended when the vehicle is brought to a stop. However, instead of supplying this energy by large powerful on-board engines, as in conventional ground transportation systems, it is possible to remove them completely and utilize a vast energy resource that nature has placed at our disposal — namely gravity.

An object of this invention is to provide a gravity powered ground transportation system that is versatile and that will give very high operating speeds with very little energy consumption. This will be achieved by designing the vehicle so that it can move with almost zero friction in vacuum tunnels and therefore capable of converting potential energy into kinetic energy and vice versa through the principle of conservation of energy with almost no perceptible loss.

Before proceeding to a description of the invention it should be noted that gravity power and the process of transforming potential energy into kinetic energy is not new. In fact it is the source of water wheel power and more modern hydroelectric power. However, large machines that regularly transform potential energy into kinetic energy and vice versa have a more recent origin. Moreover, they have tended to emerge as machines of amusement rather than machines for practical work. The roller coaster is an excellent example. Unfortunately, rolling friction and air resistance give them rather low conversion efficiencies. There are many hybrid machines that utilize a combination of energy sources such as heat, potential and kinetic energies. Airplanes are examples.

One interesting machine proposed by Edwards in U.S. Pat. No. 3,605,629, for ground transportation utilized pneumatic atmospheric pressure, potential and kinetic energies. See also his U.S. Pat. No. 3,601,158. The system involved vehicles propelled as a free piston through air tight tubes by a differential air pressure applied between the ends of the vehicle. Although an assist was supplied by gravity, the system was primarily designed around the pneumatic propulsion concept and required a great deal of large pneumatic support equipment such as compressors, valves, vents and very large air locks.

In every prior transit system large amounts of propulsive thrust are applied either within the vehicle, as by motors, or externally by pneumatic, or magnetic forces, or the classic cable cars of San Francisco.

Aside from the relatively inefficient and trivial roller coaster application of the principle of conservation of energy (potential and kinetic representations) there appears to be no previous attempt to utilize this principle as the fundamental propulsion means. The roller coaster quickly "runs down" and is clearly not suitable for a practical rapid transit system. Of course, the reason is quite obvious — frictionless motion could not be obtained. However, recent technological developments, particularly in the field of magnetic levitation, open the way for actually achieving motion without friction. This invention utilizes these developments to provide a rapid transit system that is based entirely on the principle of conservation of energy.

An object of the invention is to provide an economical general purpose rapid transit system that requires very little input energy, and does not create exhaust pollution, sight pollution, or noise pollution and will have an extremely long, obsolescent-free, minimum maintenance life span.

BRIEF SUMMARY OF THE INVENTION

Thus, in the practice of this invention according to a presently preferred embodiment there is provided a vehicle, typically consisting of a train of detachably coupled cars, suspended from a ferromagnetic monorail in a vacuum tunnel by servo-controlled electromagnets and superconducting magnets in its roof so that no part of the vehicle is in physical contact with the tunnel. Acceleration and deceleration between stations of equal elevation is achieved by allowing the vehicle to move along downward and upward reaches of the tunnel respectively. The nearly frictionless motion permitted by attractive magnetic levitation allows the transformation between potential energy and kinetic energy to take place in either direction with almost 100% efficiency. For trips between stations of unequal elevation, excess kinetic energy is recovered by regenerative braking and stored in flywheel alternator-motor energy storage units to be used later in electric motors used to reach stations at higher potential energies. An economical split-level tunnel design is provided to allow two vehicles to move simultaneously in opposite directions in the same tunnel section. A switching system is provided that is based on a form of magnetic steering that does not require any moving parts. The entire tunnel network system is sealed and kept in a hard vacuum environment.

In a preferred embodiment the individual train cars have a double hull construction for pressurization. A system of several relatively small passenger air locks are built into the tunnel walls in each station and are equally spaced so that when a train stops at a certain point, all its doors are opposite air locks. The air locks engage the car doors by flanges that are extended and inserted into air tight slots surrounding each car door.

DRAWINGS

These and other features and advantages of the present invention will be appreciated as the same becomes understood by reference to the following detailed description of a presently preferred embodiment when considered in connection with the accompanying drawings wherein.

DESCRIPTION OF THE PREFERRED EMBODIMENT

Figure 1:
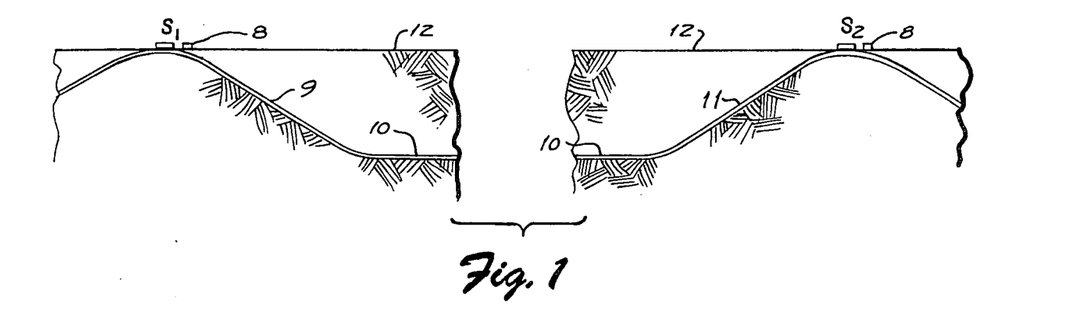
FIG. 1 illustrates a vertical longitudinal cross-section of a representative underground tunnel path connecting two adjacent stations $S_1$ and $S_2$.

FIG. 1 illustrates a vertical cross-section of a tunnel path connecting two adjacent stations $S_1$ and $S_2$ that allows a frictionless, gravity propelled vehicle to travel from $S_1$ to $S_2$ by converting its potential energy at station $S_1$ into kinetic energy by moving along its downward reach 9, coasting along its horizontal reach 10 at a constant maximum speed V, and re-converting the kinetic energy back into potential energy by moving along the upward reach 11 to station $S_2$. Ideally, the stations are situated on the same gravitational equipotential surface 12 (i.e., they have the same elevations) so that all of the vehicle's kinetic energy is transformed back into potential energy upon reaching station $S_2$. Hence, the vehicle automatically stops when it reaches station $S_2$.

If $d$ denotes the depth of the tunnel's horizontal reach 10 below the equi-potential surface 12, then the vehicle's speed V along it will be given by $V = \sqrt{2gd}$ where $g$ is earth's gravitational acceleration equal to 9.8 meters/sec$^2$ (32.15 feet/sec$^2$). If two stations are separated by a distance D and connected by a tunnel path with equal inclinations $\theta$ from the horizontal and with a horizontal reach of depth $d$, the total trip time T, is given (approximately) by the formula $$T = \frac{2V}{g \sin\Theta} + \frac{D \tan\Theta - 2d}{V \tan\Theta}$$

where $V = \sqrt{2gd}$. For a typical urban gravity powered rapid transit system, D=4.0 km (2.5 miles), $\theta$=20° and $d$=300 meters (984 feet). Then V=76.7 meters/sec (171.5 mph) and T=76.4 sec, which is equivalent to an average surface speed of 52.3 meters/sec (117 mph). For city transportation between adjacent stations this close together, these numbers represent a significant advance over existing rapid transit systems. Moreover, the passengers sense no translational acceleration whatsoever. They experience a feeling identical to moving down a vertical elevator where all forces are directed perpendicular to the car floor. A gravity propelled vehicle reaches even higher speeds while traveling between stations with greater separation distances and tunnel depths. For example, when D=35 km (21.7 miles), $\theta$=20° and $d$=1,000 meters (3,281 feet), then V=140 meters/sec (313 mph) and T=4.9 minutes. The equivalent average surface speed is 118.9 meters/sec (266.0 mph). The trip is accomplished solely by gravity power and requires essentially no input energy.

Omitting the analysis, it can be shown that the minimum possible trip time $T_{min}$, between two stations is given by $$T_{min} = \sqrt{\frac{2\pi D}{g}}$$

but this would require cycloid tunnel paths that would be very costly to construct.

Although the deep tunnel requirements may seem difficult to realize, this is not the case. The earth is actually more suitable for tunneling at deeper depths (up to about 3,500 meters where typical rock temperatures run between 125° F and 130° F) and it could proceed economically without fear of running into existing subway tunnels, sewage tunnels or utility tunnels. Deep mines have already penetrated depths of over 3,800 meters (12,500 feet). However, since the gravity powered transportation system will require many miles of deep, carefully aligned tunnels, the construction costs will be greatly reduced by designing the tunnel so that it could accommodate two vehicles moving simultaneously in opposite directions. A transverse cross-section of a "split-level" tunnel design appears in FIG. 2.

Figure 2:
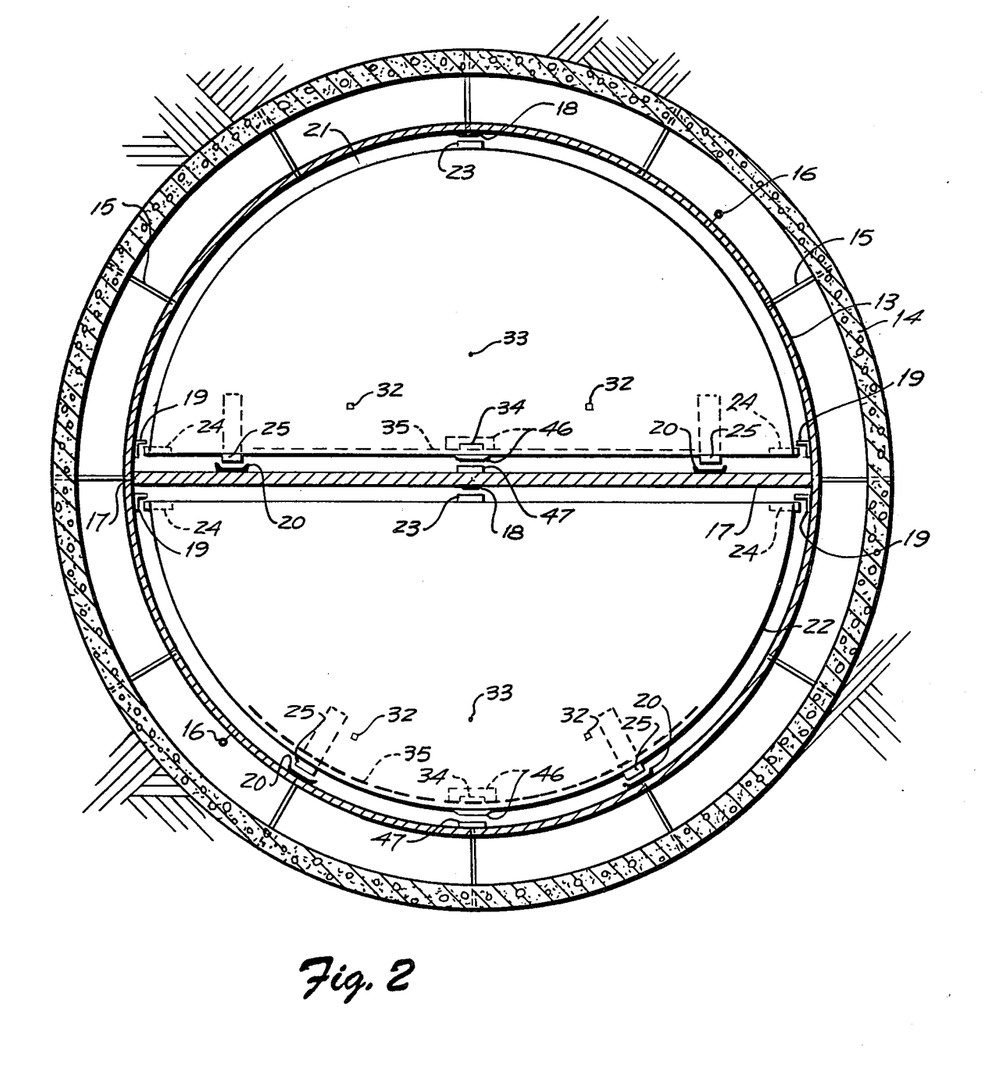
FIG. 2 is a transverse cross-section of the outer tunnel and inner, split-level vacuum tunnel mounted inside and containing upper and lower level cars.

The split-level vacuum tunnel 13 is rigidly mounted and supported within an outer tunnel 14 by steel rods 15. Although the initial tunnel 14 is bored with high accuracy, minor final adjustments for the alignment of the vacuum tunnel are possible by adjusting the supporting rods 15. One end of these rods 15 is embedded in the outer tunnel 14 and the other end is attached to the vacuum tunnel 13 by an adjustable screw that can be turned from inside the vacuum tunnel. The distance between the outer and inner tunnel is varied by turning these screws. Although the screws are made air-tight, they are further sealed with a suitable air-tight sealer (that could be removed later for additional adjustments). The adjustments will be carried out when the inner tunnel is evacuated to its operational state. Pressure suits are worn by the alignment crew. This mounting also allows economical realignment of the vacuum tunnel after many years of service in the event of a minor earth shift.

According to a presently preferred embodiment, the initial tunnel is bored to a diameter of 7 meters (23 feet) having a cross-sectional area of 38.5 meters$^2$ (414.2 ft$^2$). The outer tunnel wall is reinforced concrete with thickness 20 centimeters (7.9 inches). (In some areas of hard rock this reinforced concrete liner is unnecessary.) The nominal spacing between the outer wall of the vacuum tunnel and inner wall of the outer tunnel is 45 centimeters (1.5 feet).

In order for the alignment of the inner vacuum tunnel to be constantly monitored, an alignment monitoring system using laser beams is provided. A laser beam is transmitted parallel to the outside walls of the vacuum tunnel through a series of holes through light sensitive sensors 16 located about every 200 meters. In a properly aligned straight tunnel section, the beam will pass through all the holes without any irradiation of the sensor. When a tunnel section gets out of alignment, the beam falls partially on the light sensitive material surrounding the target hole causing a warning signal to be transmitted to the central control room. For curved sections, the sights will have built in lenses and mirrors that bend and transmit the beam by a given angle corresponding to the tunnel's design radius of curvature. Thus, the system will also identify any misaligned curved sections.

The wall thickness of the steel vacuum tunnel is 2 centimeters (0.79 inches). A system of parallel steel support I-beams 17, approximately 10 centimeters (4 inches) high, inside the vacuum tunnel and perpendicular to its walls, partition it into two corridors, one above the other. A ferromagnetic monorail 18 of high resistivity (usually steel) extends 9 centimeters (3.54 inches) into each tunnel corridor from the center of each ceiling. (The ceiling of the lower corridor is an open network since it is formed by the beams 17.) The monorails are rigidly mounted (usually welded) and run parallel to each corridor. Smaller higher resistivity, ferromagnetic guide rails 19 (usually steel) are used to prevent each car from moving too far to the left or right and striking the interior walls of the vacuum tunnel. However, the monorails are mounted so that the cars in each level are suspended downward symmetrically within each tunnel corridor in the event of a failure in the guidance magnets. If a failure in the main levitation magnets causes one end of a car to fall away from the monorail, a pair of grooved "fail-safe" tracks 20 are provided that run along the bottom of each tunnel corridor.

Figure 3:
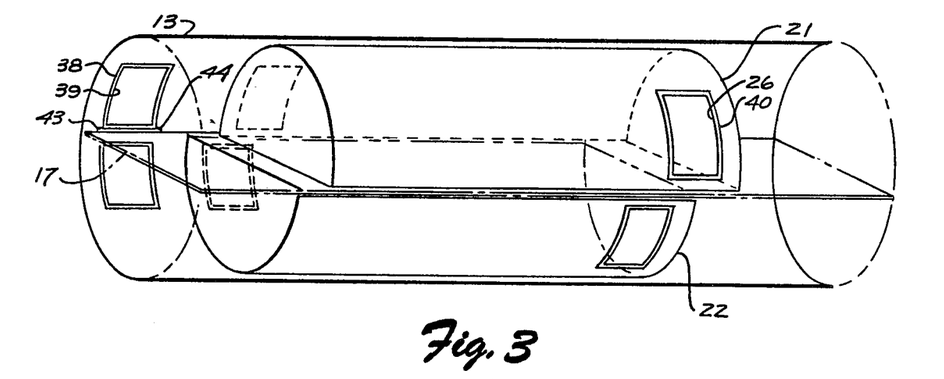
FIG. 3 is a schematic perspective view of the split-level tunnel design showing an upper level car and a lower level car.

The split-level vacuum tunnel design results in unconventional vehicle designs. The vehicles (typically comprising trains of detachably coupled cars) operating on each level have semi-cylindrical shapes as seen in FIG. 3. The upper level cars 21 have a flat base while the lower level cars 22 have a flat roof. The suspension electromagnets 23 and the guidance electromagnets 24 (FIG. 2) have nominal rail gap separation distances of 2 centimeters (0.79 inches). Fail-safe wheels 25 extend 7 centimeters (2.76 inches) from each car's body and have a nominal position 2 centimeters (0.79 inches) above the fail-safe rails 20. The fail-safe rails 20 extend 6 centimeters (2.36 inches) above the partition 17 for the upper level corridor and extend 6 centimeters from the tunnel wall in the lower level corridor. The nominal car-tunnel wall separation distance for both upper level 21 and lower level 22 cars is 15 centimeters (5.9 inches). In view of the above dimensions the inside wall of the vacuum tunnel 13 has a radius of 2.83 meters (9.28 feet) and the transverse radius of curvature of each car is 2.68 meters (8.79 feet). Hence, each car has an exterior maximum height of 2.48 meters (8.14 feet) and an exterior maximum width of 5.36 meters (17.6 feet).

Figure 4:
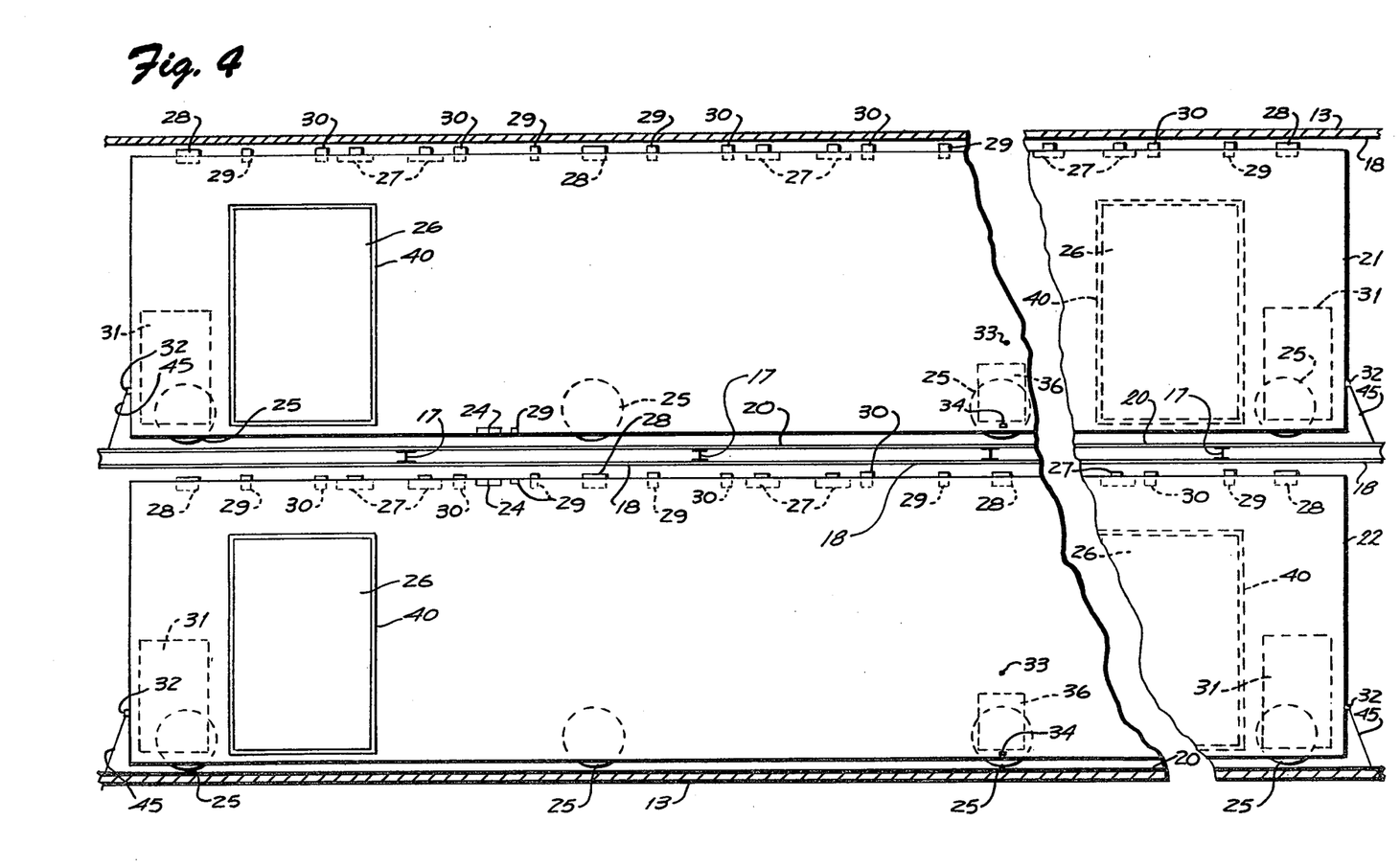
FIG. 4 is a vertical longitudinal cross-section of the split-level tunnel showing an upper level car and a lower level car with their suspension electromagnets.
Figure 5:
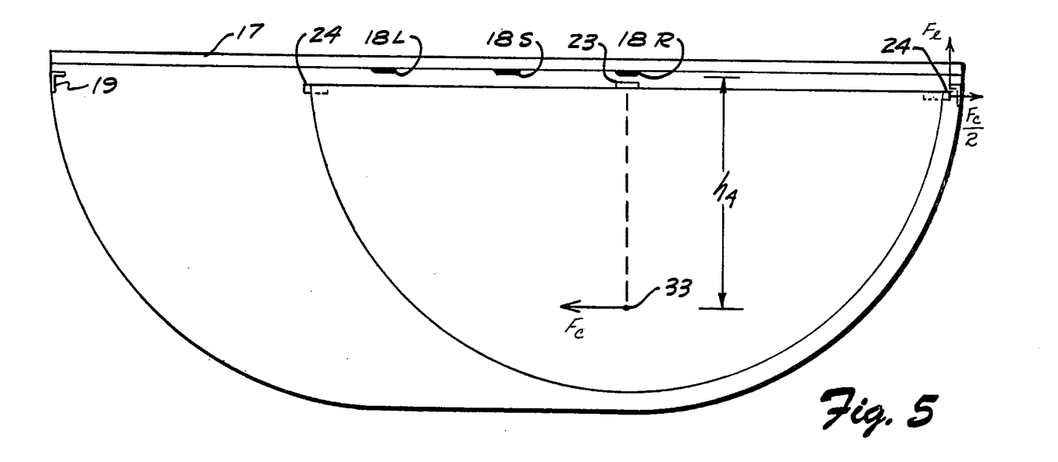

A vertical longitudinal cross-section of the split-level vacuum tunnel 13 is shown in FIG. 4 along with an upper level car 21 and a lower level car 22. Each car is 15 meters long (49.2 feet) and can accommodate about 50 passengers. They have a double hull design for cabin pressurization and are constructed from light weight materials such as aluminum (similar to the cabins of modern commercial jet transports). An estimated empty weight is about 25,000 kgm (27.6 tons). Each car has two doors 26 located on opposite ends and opposite sides. Passenger movement proceeds sufficiently by allowing passengers to enter the car by one door and exit through the other. Each car also has ten steel fail-safe wheels 25 mounted five on a side equidistant from each other. The wheels have rubber outer rims to provide traction along the inclined reaches of the tunnel if the magnetic levitation magnets 23 should fail. Even though the fail-safe wheels 25 are normally 2 centimeters above the fail-safe tracks 20 and therefore out of contact with them while the vehicle is coasting between stations they are kept spinning at approximately vehicle speed by small electric motors to reduce any possible shock in the event they contact the rails while the vehicle is moving at high speeds. The wheels 25 are also equipped with an emergency braking system.

The levitation magnets 23 are mounted within the ceilings of each car so that the cars are suspended from their respective ferromagnetic monorails 18 by magnetic attraction forces without actually being in physical contact with them. This suspension is in distinct contrast with usual monorail suspension systems that typically require a considerable amount of overhead equipment (called truck assemblies). Attractive magnetic levitation is required rather than repulsive magnetic levitation because the former does not produce any magnetic drag. The monorails 18 and guide rails 19, being ferromagnetic with high resistivity do not generate the drag producing eddy currents characteristic of repulsive levitation. This distinction plays a key role in the gravity powered transportation system because it gives the required frictionless motion. Air friction is essentially eliminated by maintaining the inner tunnel in a high vacuum environment. Typically, this vacuum is maintained at $10^{-3}$ torr by low power pumping stations 8 (FIG. 1) at selected points along the tunnel. The vehicles have a frontal aerodynamic shape factor of 0.88 (*Theoretical Hydrodynamics* by L. Thomson). Since their frontal cross-sectional area is 11.28 meters$^2$, the tunnel blockage ratio (cross-sectional area of vehicle divided by cross-sectional area of tunnel) is 0.45 and the aerodynamic drag (which is essentially the only drag) at 140 m/sec (313 mph) is less than 4 ounces. (See also "A Parametric Model of High Speed Ground Transportation" by G. Hoffman, *Transportation Research* Vol. 3, 1969, pages 318 – 319 and "Aerodynamics of Tube Vehicle Systems" by A. Hammitt, *High Speed Ground Transportation Journal*, Vol. 4, No. 3, September 1970).

The levitating magnets are servo-controlled conventional iron-core electromagnets 27 assisted by several superconducting magnets 28 of equal but fixed field strengths. A suitable superconducting magnet is described in U.S. Pat. No. 3,748,615 by Bogner, et al. Superconducting magnets have no electrical resistance and, aside from the relatively small amount of power needed for refrigeration, consume no power to maintain their magnetic field. Each upper level and lower level car has five superconducting magnets 28 and eight servo-controlled ordinary iron-core electromagnets 27. The heads of all eight electromagnets are 4 centimeters (1.57 inches) above the roofs of each car and have a nominal rail gap separation distance of 2 centimeters (0.787 inches). They require about 2 kw per ton of levitating force for this gap distance. Wheels or skids 29, mounted on the roofs of each car directly below the monorails 18, prevent gap distances closer than 1 centimeter (0.39 inches). The flux in the five super-conducting magnets 28 is such that their combined lifting force at the minimum gap distance (1 centimeter) is 23,000 kgm so at this minimum gap distance, the ordinary electromagnets have to supply only 2,000 kgm of lift to keep an empty car levitated. This mixed mode levitating system therefore reduces the power that would ordinarily be required to maintain levitation if all of the magnets were ordinary iron-core electromagnets.

The nominal 2 centimeter gap distance is maintained by sensors 30 located near the electromagnets that measure (essentially instantaneously) minute changes in the gap distance and send correcting signals to electronic systems that control the current in the electromagnets. The result is an increased or decreased magnetic force if the gap becomes greater or less than the nominal 2 centimeters, respectively. A preferred servo-controlled electromagnet system for attractive levitation is explained in detail by Gebhardt and Gopfert in their U.S. Pat. No. 3,742,862. Other suitable suspension systems are described in U.S. Pat. Nos. 3,724,388 by Karch; and 3,736,880 by Ross.

The guidance magnets 24 are also servo-controlled electromagnets. Each car has eight such magnets mounted in pairs on each side and 3.5 meters from each end. One of the magnets in each pair attracts the horizontal portion of the guide rail 19 above its magnet head. The net result is a balanced upward force on each side of the car, thereby providing roll stability. The net upward force also assists the main levitation magnets. The second magnet of each pair attracts the vertical portion of the guide rail which results in a horizontal outward force perpendicular to the rail. These outward forces are cancelled out by the corresponding guidance magnets 24 on each side of the car, and result in giving it lateral stability.

Under ordinary operation each car requires from 5 kw to 30 kw of electrical power to keep its electromagnets properly energized. However, unexpected power surges exceeding 100 kw may be required from time to time to prevent loss of levitation. Since it would be difficult to supply this power density by on-board batteries, each car is equipped with two flywheel energy storage units 31 each capable of storing $10^8$ joules in their spinning flywheels. This energy is extracted and replaced by an alternator-motor system built into each unit. Power cables link each car in a train so that the total power output of several flywheel units can be concentrated to supply very high power densities to a single car if needed. Each car is equipped to receive electrical power at each station by electrical contacts 32. Contact arms flip up from the bottom of the tunnel corridors at each station to feed current into each car while it is stopped so that its flywheels can be spun back up to higher energies if needed. The alternator used to extract and convert the flywheel's kinetic energy into electrical energy is used in the reverse sense as an electric motor to convert incoming electrical energy into flywheel kinetic energy by spinning it up. Suitable flywheel alternator-motor units are described in detail by Post in U.S. Pat. No. 3,683,216.

The weight of each of these $10^8$ joule alternator-motor flywheel energy storage units is about 100 kgm (220 lbs.) and the in-out electrical efficiency exceeds 95%. The electrical energy generated by these units supplies all of the electric power needed to operate the support equipment in each car (e.g., electromagnets, refrigeration equipment, air conditioners, air circulators, electric motors for the fail-safe wheels, lighting, etc.) while it is moving between stations.

The gravity propelled, magnetically levitated monorail vehicles also have the ability to pass through tunnel intersections where they can be magnetically steered onto one of two intersecting branches smoothly and at high speeds. Moreover, no mechanical or electrical switching devices or rail movements are required at these intersections. The switching process is accomplished entirely by the vehicle itself by a form of "magnetic steering." No mechanically moving mechanisms are required. It is based upon utilizing the guidance magnets on only one side of the vehicle so that it can be guided into the desired tunnel branch, and then utilizing the resulting centrifugal force to balance out the torque.

Figures 3, 5:
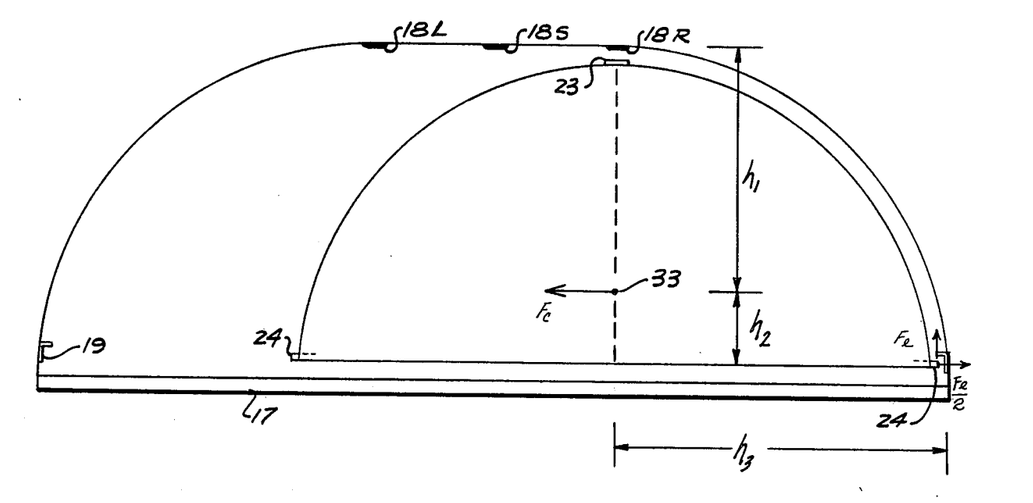
FIG. 5 is a schematic transverse cross-section illustrating the mechanics of magnetic steering through a three-way tunnel intersection.

Suppose a car is moving along a straight horizontal tunnel towards a three-way intersection with a horizontal branch R to the right, a horizontal branch L to the left and a branch S leading straight ahead. Normally, the right and left hand branches will have constant radius of curvature. Suppose the car is required to take the righthand branch. Before reaching the intersection, all four lateral guidance magnets 24 are adjusted to give attractive forces equal to one half the centrifugal force $F_c$ that will be exerted on the car as it rounds the curve entering the right side tunnel. The lift guidance magnets 24 are adjusted to give a lift force $F_1$ such that the net counter-clockwise torque on the car about the monorail 18 cancels the clockwise torque produced by the centrifugal force vector passing through the car's center of mass 33.

When the forward guidance magnets cross the tunnel intersection, power to the left forward guidance magnets is cut. The front of the car will automatically follow the right side tunnel because of the magnetic attraction. Power to the left rear guidance magnets is cut when they are adjacent the tunnel intersection. The pre-set attractive forces in the right guidance magnets (under the control of the gap sensors) allows the car to pass smoothly into the side tunnel. FIG. 5 illustrates the mechanics of this process. In this figure, $h_1$ denotes the perpendicular distance between an upper level car's longitudinal center of mass axis and its monorail. The perpendicular distance between an upper level car's center of mass axis and the transverse force vectors of its lateral guidance electromagnets is denoted by $h_2$. The distance, denoted by $h_3$, is equal to half the car width (same for both upper and lower level cars). The perpendicular distance between a lower level car's longitudinal center of mass axis and its monorail is denoted by $h_4$. Thus, the lift force $F_1$ in each roll guidance electromagnet of upper level cars entering a branching side tunnel is determined by:

$F_c h_1$ (clockwise torque) = $F_c h_2 + F_1 h_3$
(counter-clockwise torque)

while for lower level cars, the value is determined by $F_c h_4$ (clockwise torque) = $2F_1 h_3$ (counter-clockwise torque).

If the car is required to take the left hand branch, the procedure is the same except that at the intersection, power to the right guidance magnets is cut instead of the left. Although the above magnetic steering at intersections has operating elements similar to a magnetic steering invention described by Ross et al in their U.S. Pat. No. 3,696,753, it differs from it in that the lift guidance electromagnets play an important and integral part of giving the vehicle roll stability while it moves onto a curving intersecting branch. The Ross patent does not use any lift guidance electromagnets.

If the vehicle is required to proceed along the straight tunnel at the intersection, power to all guidance magnets on both sides of the car is gradually reduced to zero. The car's inertia will keep it moving along a straight path. Ordinarily, the center of mass 33 of a car containing passengers will not lie in the vertical plane passing through the monorail so that when the guidance magnets are turned off, the car will not hang symmetrically in the tunnel. To correct for this situation and maintain dynamic roll stability, each car is equipped with a counter-balance weight 34 (see FIG. 2) located at the car's center between the pressure hull and the outer skin. It moves along a small track 35 perpendicular to the car's longitudinal direction. Movement of the weight is controlled by a torque (inertial) sensor such that when the car is moving along a straight tunnel section, the center of mass of the car and passenger load will always lie in the vertical plane of the monorail. Hence, although the car's passenger load may be unevenly distributed, the car will always hang symmetrically in the tunnel corridor when the guidance magnets 24 are turned off and will not contact the walls. Thus, by turning off all guidance magnets, the car will simply coast through a three-way tunnel intersection and automatically take the branch leading straight ahead. However, in order to insure stability and prevent the possibility of roll oscillations when all guidance magnets are turned off, each car is also equipped with a conventional gyro-stabilizer 36 (FIG. 4).

The minimum possible radius of curvature in the horizontal $\rho_h$ and vertical $\rho_v$ planes is determined by the maximum allowed g-forces due to the resulting centrifugal forces; or when traveling at low speeds by the sharpest curve that the vehicle can negotiate without touching any part of the tunnel wall. The latter values constitute an absolute lower bound on these curvatures. According to the dimensions given above for the presently preferred embodiment minimum $\rho_v = 1,200$ meters
minimum $\rho_h = 800$ meters.

The relatively sharp curves that can be negotiated near the station equi-potential surface 12 and the ability to perform switching at tunnel intersections enables the tunnel routing for a gravity powered rapid transit system to be very flexible and suited to many individual situations. Thus, the gravity powered rapid transit system can serve a network of stations in any designed pattern. Vehicles travel in both directions in the tunnels and can be switched to serve different destinations permitting a full grid for transit directly between any pair or group of stations as desired.

Figure 6:
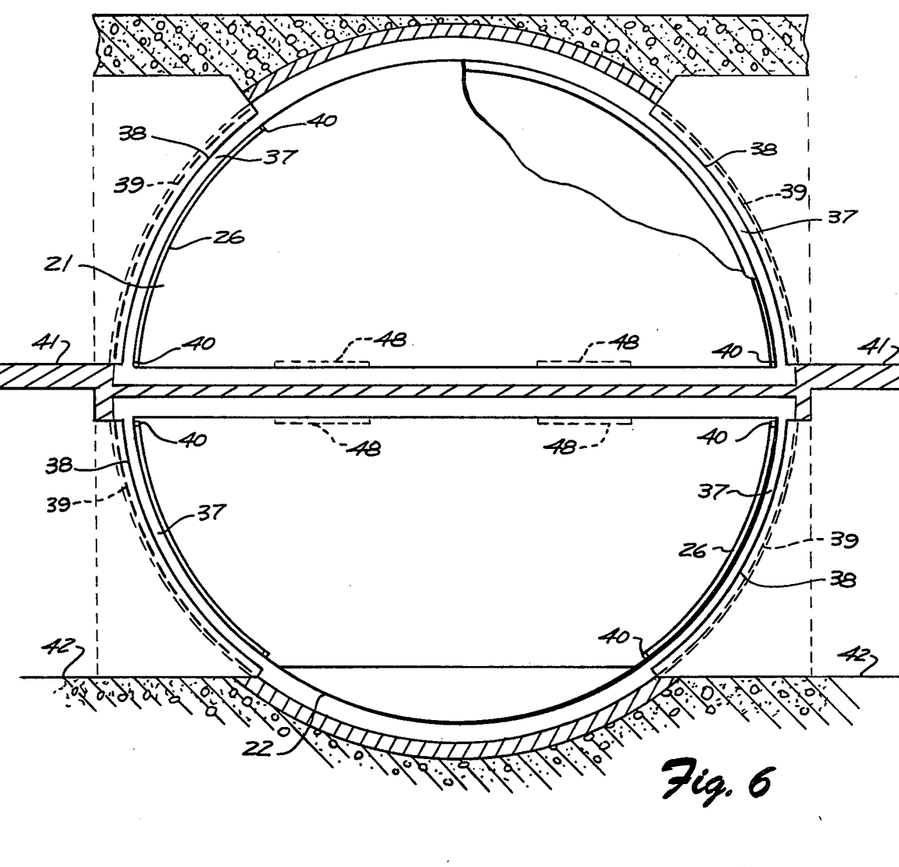
FIG. 6 is a transverse vertical tunnel cross-section illustrating the air-locks that permit direct passage between a car's interior and a station platform while the car remains in a hard vacuum environment.
Figure 8:
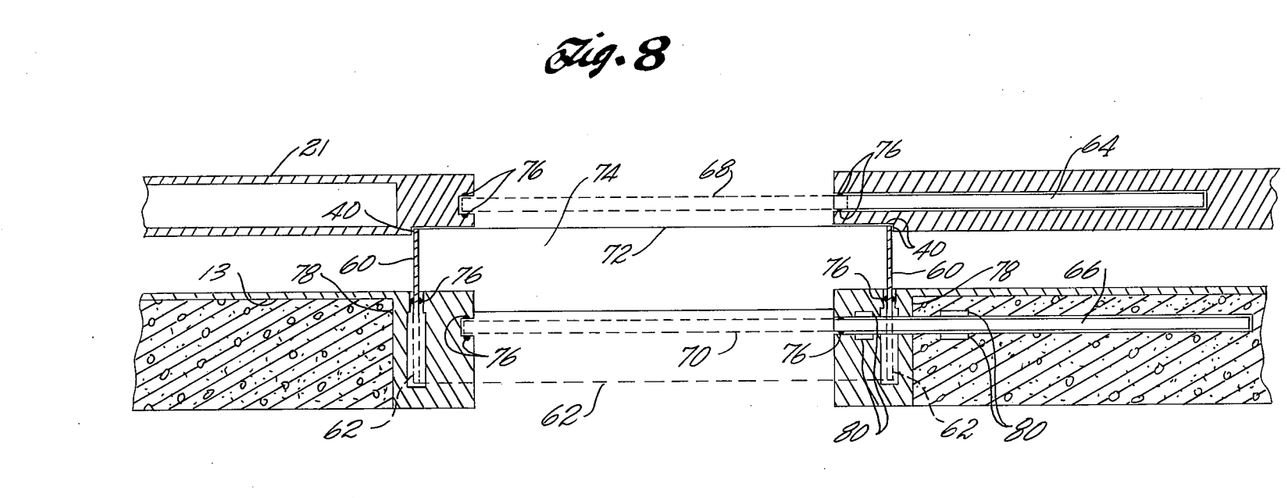
FIG. 8 illustrates an air lock system.

As noted above, the entire tunnel network is sealed and kept in a constant hard vacuum environment. Each operating vehicle is therefore constantly exposed to this hard vacuum even while at a station during the boarding and unboarding of passengers. Hence, a system of air-locks 37 as shown in FIGS. 6 and 8 is provided in each station to allow the passage of passengers or freight between the station and vehicle. The air-locks 37 are equally spaced in each station so that when a train is stopped at a certain position, all the car doors 26 are opposite air-locks 37. The air-locks 37 engage each car door 26 by flanges 38 like flanges 45 in U.S. Pat. No. 3,407,537 by Urbanick, that completely surround airtight doors 39 in the tunnel walls (FIG. 3). When the flanges 38 are extended they fit into air-tight slots 40 like the slot 30 in the Urbanick patent, that also completely surround each car door 26. The effect of this connection seals off a small volume of space bounded by the flanges 38, the car door 26 and the tunnel wall door 39 and forms the air-lock 37. Air is allowed to pass into this air-lock 37 until atmospheric pressure is reached. The car doors 26 and tunnel wall doors 39 are then opened allowing passengers to move between the station and each car while the exterior of the car remains in the tunnel's hard vacuum environment. The interiors of each station adjacent the vacuum tunnel 13 have two levels, one level 41, serving passengers riding on upper level trains 21 and the other 42, serving passengers riding on lower level trains 22 (FIG. 6).

FIG. 8 is an enlarged transverse cross section of the air lock system 37. The flange 38 has a rectangular longitudinal cross section that completely surrounds the tunnel doorway 39 (and car doorway as shown in FIG. 3). In FIG. 8 the flange is shown in an extended position 60 as used during the transfer of passengers, and in a retracted position 62 illustrated in phantom. The car door and tunnel wall door are illustrated in the open positions 64 and 66 respectively, as used during the transfer of passengers, and are also illustrated in the closed positions 68 and 70, respectively, shown in phantom.

When the flange 38 is in the extended position 30, one edge 72 fits into the airtight slot 40 that completely surrounds the car door 68 on the car 21. This connection forms an airtight seal around the car door 68 and separates the air lock chamber 74 from the vacuum of the tunnel by way of the walls of the flange 38. The closed car door 68 and closed tunnel wall door 70 form the other two walls of the air lock. An airtight flange seal is further described and illustrated in the aforementioned U.S. Pat. No. 3,407,537 by Urbanick. Conventional airtight seals are employed around other points of the structure, for example, at locations 76, in order to make the air lock chamber 74 completely airtight. Such seals can be made in a variety of ways well known in the art of air lock construction, including inflatable seals, such as, for example, elements 40, 42, 54, and 56 in FIG. 3 of U.S. Pat. No. 3,678,624 by Bicicchi.

After the chamber 74 of the air lock is brought to atmospheric pressure, the car door 68 and tunnel wall door 70 are opened to allow passenger transfer. Construction of suitable sliding airtight doors are described and illustrated in U.S. Pat. No. 3,407,536 by Nystrom. After passenger transfer is completed, the car and tunnel doors are closed and the chamber 74 is evacuated to the pressure of the tunnel (e.g., $10^{-3}$ torr). The flange 60 is then retracted in a direction perpendicular to the tunnel wall by conventional mechanical, hydraulic or pneumatic actuators 78 illustrated schematically in FIG. 8. The tunnel wall door 70 is also opened and closed by conventional mechanical, pneumatic or hydraulic actuators 80 indicated schematically in FIG. 8.

Before leaving the station, the car doors 26 and tunnel wall doors 39 are closed and the air is evacuated from the air-locks 37. Since the volume of the air-locks 37 is small (e.g., 10 liters or less) it does not take long to evacuate it down to $10^{-3}$ torr. If the train is composed of 5 cars there are 10 air-locks to evacuate simultaneously. This is accomplished in two stages. First, a valve connected to a vacuum hose 43 that leads to a central oil-seal vacuum pump is opened in each air-lock so that the pressure is reduced to about 1 torr. This takes less than 5 seconds. The valves are then closed and another valve located in each air-lock is opened. This valve is connected to another vacuum hose 44 that leads to a large vacuum tank of about 20 cubic meters evacuated to a pressure of about $10^{31\ 6}$ torr. Each station is provided with two of these vacuum storage tanks for the air-locks on each of the two levels. Thus, when these second valves are opened in each air-lock, the pressure is further reduced to about $10^{-3}$ torr or less, depending upon how many air-locks dump their residual air in the common vacuum storage tank. A relatively low power diffusion pump, that operates continuously, restores the vacuum storage tank to its $10^{-6}$ torr level before the next train arrives. The pressure reduction from 1 torr to $10^{-3}$ torr in each air-lock is accomplished very quickly when the second valves are opened. The flanges 38 are then retracted and the train departs. This is an important feature of the system because it allows the train to depart from the station without having to wait a long time until an operating level vacuum has been restored to large air-locks that contain an entire car or train. Larger air locks are, of course, used for adding or removing cars.

Each car is equipped with its own life support equipment such as pressurized air tanks, air conditioning and circulating equipment, etc., with adequate reserves in the event a vehicle is stopped between stations due to vehicle malfunction. Each car is also connected to adjacent cars of a train by umbilical lines so that pressurized air could be supplied from neighboring cars if needed.

When a train arrives at a station it must be stopped at a precise point so that each car door 26 will be properly positioned to receive the flanges 38. The vehicle coupling system keeps the cars separated by a constant distance even under compression or tension forces. In order to insure proper door-flange alignment for each car, each car must be accurately positioned both vertically and horizontally. The correct vertical positioning is accomplished by raising the level of the fail-safe rails 20, which normally extend 6 centimeters above the bottom of each corridor, to a new elevation of 8 centimeters in the vicinity of each station. At this level the car's wheels 25 contact the fail-safe rails 20. The levitation magnet gap distance is then the nominal 2 centimeters. The tunnel 13 and raised fail-safe rails 20 adjacent each station are perfectly horizontal. The guidance electromagnets 24 and lifting electromagnets 27 are then turned off to allow about 20% of each car's weight to be supported by its wheels 25. This enables the car to have a perfectly level orientation at a fixed height in each station. The correct horizontal positioning is accomplished by two positioning arms 45 (FIG. 4), that flip up from the bottom of the tunnel corridor, slightly ahead and slightly to the rear of each individual car. Each car is then physically moved slightly to the correct final position with high accuracy (e.g., $\pm 1/16$ inch). These arms 45 also serve as the electrical connections to each car so that it can be fed electrical current through the contacts 32. As mentioned above, this current is used to spin up the car's generator-motor flywheel energy storage units.

Since the trains are in a perfectly level orientation while at each station, they must be started on their journey to the next station by some mechanical means. This is provided by electric motors different from those that keep the wheels 25 spinning during the trip. The train, therefore, begins its descent down to its cruising depth with some initial speed $V_o$. When the desired initial speed is reached, the lift magnets 27 gradually increase their lift force until they (together with the superconducting magnets 28) support the entire vehicle and the fail-safe rails 20 gradually drop to their regular height of 6 centimeters above the bottom of the tunnel corridor. When the train approaches the next station near the top of its ascent from its cruising depth, the fail-safe rails 20 rise gradually from 6 centimeters to 8 centimeters and the lifting magnets 27 are cut off to allow about 20% of each car's weight to be supported by its wheels 25. The motors on the wheels 25 are similar to the motors on the flywheels and serve as generators, thereby supplying the necessary braking. Thus, braking torque is not accomplished by conventional brake drums that dissipate the vehicle's excess kinetic energy into heat, but by torque supplied from turning its generators (i.e., motor-generators) connected to the wheels 25. This regenerative braking allows essentially all of the vehicle's excess kinetic energy to be returned to the spinning flywheels. The process is explained in detail by Post in his U.S. Pat. No. 3,683,216. A computer controlled braking procedure is preferred for bringing the train to a stop smoothing at, or very close to the desired position.

In an ideal situation, all stations would be situated on the same gravitational equi-potential, surface, i.e. elevation. However, the local topography of certain urban or inter-city areas may not be suited for this lay out. For example, the elevation of two adjacent station locations may differ by as much as 100 meters or more. This situation is solved by "borrowing" the additional energy required to reach higher elevations from the vehicle's flywheel energy storage units and returning it later by regenerative braking when the vehicle returns to the lower elevations. Conceivably the $2 \times 10^8$ joules of flywheel energy that could be put in each 25,000 kgm car leaving a station with 3,500 kgm of passengers could raise it to an elevation 716 meters (2,349 feet) above the departing station.

The required excess energy is transmitted to the car by its wheel motors while it leaves the station and begins to descend down the sloping reach. When the required excess energy has been delivered, power to the motors is cut and the car is levitated by its magnets. The accelerations of all vehicles moving between a given pair of stations is the same so that the motor cut-off point is the same for all vehicles. At this point the fail-safe rails 20 gradually return to their normal level of 6 centimeters above the bottom of each tunnel corridor. In order to insure a fixed acceleration profile for each vehicle, power to the electric motors is preferably computer controlled. After the motor cut-off point is reached and the vehicle becomes magnetically levitated, it continues to move down the sloping reach, picking up more speed as it is accelerated by gravity. It levels off along the horizontal reach when the cruise depth is reached, coasts along the horizontal reach at some maximum velocity and then coasts up the upward reach to the next station at the higher elevation. Deceleration by gravity is automatic and constant until the final regenerative braking occurs bringing the vehicle to a stop. If the third station is at a lower elevation, the flywheels are not spun back up to full capacity since they will receive additional excess energy by regenerative braking upon arriving at the third station. The horsepower rating of each wheel motor-generator unit can be increased (for example to 30 HP per wheel giving a total of 300 HP per car) if a particular situation requires stations having significantly different elevations.

Although flywheel energy is utilized in a minor manner to provide auxiliary propulsion, it should be emphasized that the system is still gravity powered. The excess gravitational potential energy arising when a vehicle departs one station and arrives at another station at a lower elevation is collected via regenerative braking and stored in the flywheel's energy storage unit to be used later when moving back up to another station of higher elevation. If the in-out flywheel energy storage efficiency were 100%, and the in-out wheel motor-generator efficiency were 100%, and there were no wheel-on-rail friction losses such that there is no loss during the energy transformations, the vehicles could, in addition to being able to move between two points of equal elevation without requiring any input energy, also move between two points of different elevation without requiring any input energy.

Thus, the flywheel energy storage system, together with the wheel motor-generator system is an integral part of the gravity powered rapid transit system because it removes the constraint of having to locate the stations on the same two-dimensional plane determined by the gravitational equi-potential surface and allows complete three-dimensional freedom for their location. Moreover, when the flywheel energy storage system is not needed to temporarily store the potential energy differences between stations having different elevations, it can be used to increase vehicle speeds. A vehicle departing one station for another station of equal elevation can use its flywheel energy to increase the vehicle's departing kinetic energy and, subsequently, put the energy back into the flywheel by regenerative braking when approaching the second station. Of course, a certain amount of energy storage capacity must be set aside for on-board power requirements. The total flywheel energy of $2 \times 10^8$ joules in each 25,000 kgm car is equivalent to increasing the tunnel depth between stations over 700 meters. Thus, the cruising speed at a depth of 4,000 meters can be increased from 280 m/sec (626 mph) to 307 m/sec (687 mph) which exceeds present commercial jet airline speeds.

Since each $10^8$ joule flywheel energy storage unit weighs only about 100 kgm, each car's flywheel energy storage capacity can be increased to $10^9$ joules by installing 10 of these units in each car instead of two. The total weight would be about 1,000 kgm or 2,200 lbs (which is only 4% of the car weight). If all this energy were added to the car's kinetic energy, its cruising speed at 4,000 meters would be 398 m/sec or 890 mph. A large fraction of the $10^9$ joules would be returned to the flywheels by regenerative braking (that would begin after the vehicle slows down to about 650 mph after climbing almost all the way up from the 4,000 meter cruising depth). However, for these very high speeds, linear motors 46 (FIG. 2) with regenerative braking will be required. These motor-generator units will provide propulsion and braking without requiring physical contact with their reaction rails 47 (located only in the vicinity of widely separated stations) so that the vehicle could be totally magnetically levitated during high speed motor propulsion and regenerative braking. (See "The Linear Motor Comes of Age," by H. Yong and J. Best, *Electrical World,* Dec. 1, 1970, pages 60 – 62.)

Let the motor cut-off speed for a vehicle moving between two stations be denoted by $V_o$. Let $h$ denote the vertical distance below the gravitational equi-potential surface passing through the cut-off point. Then the vehicle's coasting speed V throughout the remaining tunnel is determined by the formula $V = \sqrt{2gh + V_o^2}$ ($h$ is negative when coasting at elevations above this point). Consequently, all vehicles will pass each point in the entire tunnel network with the same speed. Thus, it is impossible for one vehicle to catch up to the vehicle preceeding it no matter how close together they may be. This fact enables the system to operate efficiently with a very small headway schedule. During high passenger density periods, a rate of 20 trains per hour can be maintained in both directions. If each train is 10 cars long, this is equivalent to the movement of 10,000 (seated) passengers per hour in each direction.

When rounding a curve, the partition frame 17 and all rails on both levels are banked so that the vehicle's acceleration vector due to centrifugal force is always perpendicular to the partition frame 17 (except when passing through tunnel intersections). Thus, if the guidance magnets 24 were turned off, each car suspended from its monorail 18 would remain perfectly symmetrically oriented within each tunnel corridor even while rounding a curve at high speed. If $\phi$ denotes the banking angle and $\rho h$ denotes the tunnel's radius of curvature in the horizontal plane, then $$\tan \phi = V^2/g\rho h$$

However, since each vehicle has a coasting speed $V = \sqrt{2gh + V_o^2}$, the banking formula for tunnel sections when the vehicles are coasting can be expressed as $$\tan \phi = (2gh + V_o^2)/g\rho h$$

and tunnel corridors are banked according to this formula.

Figure 7:
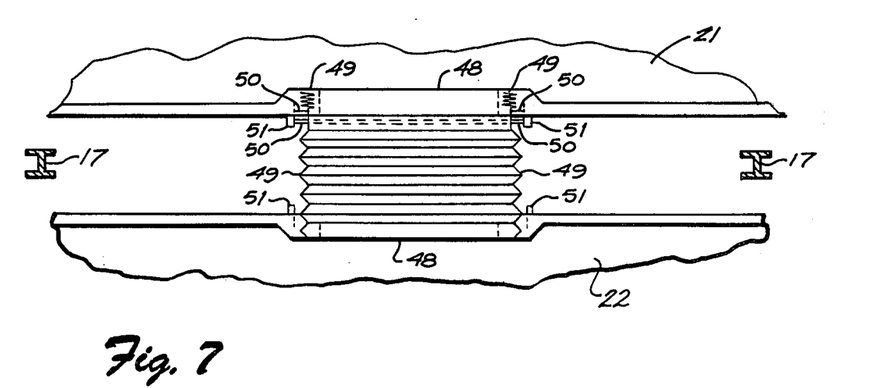
FIG. 7 illustrates an emergency escape air lock system.

Means are provided by which all passengers can be safely evacuated from a vehicle in case it is stopped between stations due to a malfunction without having to pressurize the entire tunnel system or without having to tow the vehicle to the nearest station before evacuation. As illustrated in FIG. 7, a small, air-tight circular escape hatch 48 is installed directly in front of each door 26 on the floors of upper level cars 21, and on the ceilings of lower level cars 22 (see also FIG. 6). They are located such that when a lower level car 22 is directly under an upper level car 21, the escape hatches 48 are directly opposite each other on each side of the partition frame 17 and not obstructed by the lower level monorail 18 or upper level fail-safe tracks 20. Each escape hatch 48 is equipped with a retractable flexible tube 49, with an expanding end diameter 50, that can be extended manually between the open partition beams 17 to engage an air-tight circular rim 51 surrounding the other escape hatch 48. The air-lock, resulting from the connection, is then pressurized to atmospheric pressure so that the escape hatches 48 in both vehicles can be opened. Thus, every upper level vehicle 21 is capable of rescuing passengers stranded in a lower level vehicle 22 and vice versa. The wheel motors are sufficiently powerful to take the vehicles up all sloping tunnel reaches. However, the rescuing vehicle will bring along extra portable flywheel energy storage units in case the climb requires more energy than its normal flywheel energy storage capacity.

There are two escape hatches 48 in each car. The longitudinal distance between these two hatches 48 is not commensurate with a multiple of the distance between adjacent transverse cross beams 17 that comprise the partition frame within the vacuum tunnel 13. Thus, if one hatch 48 is obstructed by such a supporting beam 17, the other hatch 48 will automatically be free of such obstruction. This escape system arrests possible psychological fears a person may have regarding the possibility of becoming stranded within a vehicle confined within a small vacuum tunnel deep underground far away from the nearest station.

A major advantage of the gravity powered rapid transit system described herein is that it provides efficient transportation for passengers (or freight) without requiring the expenditure of significant amounts of energy. Moreover, contrary to prior-art transportation systems, the energy it does expend does not depend upon the transportation loads or speeds. Speeds as high as 625 mph will be possible (without any auxiliary propulsion), yet it does not produce any air pollution, noise pollution or sight pollution. The installation of the system would create a minimum of community disruption and would not require the acquisition of costly rights-of-way.

Many modifications and variations of the above embodiments can be devised by one skilled in the art. Thus, for example, instead of using a single overhead monorail suspension system for the cars, other magnetic levitation systems can be employed. A pair of ferromagnetic rails may be provided near sides of the tunnel for attractive magnetic levitation above a portion of the car, or one or more T-shaped slots beneath the car can be used for attractive levitation. Such suspension can alleviate some of the roll stability requirements but need a different "switching" arrangement than a single overhead monorail. The pair of magnetic support rails can be configured to provide the roll and lateral stability needed for high speeds. As various changes can be made in the above construction without departing from the scope of the invention, it is intended that all matter contained in the above description or shown in the accompanying drawings should be interpreted as illustrative and not in a limiting sense.

What is claimed is:

1. A rapid transit system comprising:
   a plurality of stations;
   tunnels extending underground between adjacent stations of said system, each of said tunnels between said stations comprising two sloping reaches separated by one horizontal reach;
   means for evacuating and maintaining vacuum in said tunnels;
   a ferromagnetic suspension rail of high resistivity extending lengthwise along the tunnel;
   a vehicle in the tunnel;
   a plurality of electromagnets on the vehicle for suspending the vehicle from the ferromagnetic rail by magnetic attraction so that no part of the vehicle is in physical contact with any part of the tunnel when it is coasting between stations;
   said vehicle being propelled essentially by gravity when moving from one station to another station at equal elevations where acceleration propulsion is obtained by moving down one sloping reach of the vacuum tunnel, thereby converting gravitational potential energy into kinetic energy, and where deceleration is obtained by moving up another sloping reach of the tunnel, thereby converting kinetic energy back into gravitational potential energy to be used later for making the next trip;
   magnetic means for roll stabilizing the vehicle about its longitudinal axis;
   means for starting and stopping said vehicle in the immediate vicinity of each station; and
   at least one air lock at each station for connection between the interior of the vehicle and the station to allow passage between such a station and the interior of the vehicle when stopped at the station without removing the vacuum environment from the tunnel surrounding the vehicle at the station.

2. A rapid transit system as set forth in claim 1 further comprising means on the vehicle for recovering and storing excess potential energy when moving from one station at a higher elevation to another station at a lower elevation so that it can be used later in propelling the vehicle from a station at the lower elevation to a station at a higher elevation.

3. A rapid transit system as set forth in claim 2 wherein said means for recovering, storing and using excess potential energy derived from moving between stations of different elevations comprising:
   wheels for partial vehicle support in the vicinity of each station;
   generator-motor means connected to the axle of each wheel for regenerative braking and auxiliary propulsion; and
   flywheel motor-alternator energy storage units located on-board said vehicle for transforming incoming electrical energy derived from regenerative vehicle braking into flywheel inertial energy for storage and for transforming stored flywheel inertial energy into electrical energy to power said wheel motors.

4. A rapid transit system as set forth in claim 2 wherein said means for recovering, storing and using excess potential energy derived from moving between stations of different elevations comprising:
   regenerative linear motors for regenerative braking and propulsion without physically contacting a reaction rail fixed within the tunnel; and
   flywheel motor-alternator energy storage units located on-board said vehicle for transforming incoming electrical energy derived from regenerative vehicle braking into flywheel inertial energy for storage and for transforming stored flywheel inertial energy into electrical energy to power said linear motors.

5. A rapid transit system as set forth in claim 1 further comprising means for increasing the vehicle's speed by using additional energy stored on board the vehicle which is recovered later during deceleration by regenerative braking.

6. A rapid transit system as set forth in claim 1 wherein the ferromagnetic suspension rail is a monorail along an upper portion of the tunnel and said means for vehicle roll stability comprises:
   a pair of ferromagnetic guide rails of high resistivity extending along the length of the tunnel on each side of the ferromagnetic suspension rail and parallel to it; and
   servo-controlled electromagnet means located on each side of the vehicle for maintaining a constant rail-magnet head gap distance.

7. A rapid transit system as set forth in claim 1 further comprising:
   a pair of "fail-safe" rails in the tunnel; and
   a plurality of "fail-safe" wheels beneath the vehicle and normally spaced apart from the rails so that if magnetic levitation is lost, the vehicle automatically descends a short distance onto the "fail-safe" rails with the wheels providing stabilizing support.

8. A rapid transit system as set forth in claim 7 wherein said "fail-safe" rails have an elevated construction in the vicinity of each station for providing partial vehicle support by contacting said "fail-safe" wheels; and further comprising:
- motor-generator means connected to said wheels for providing auxiliary propulsion and regenerative braking used in starting and stopping said vehicle at each station;
- a flywheel energy storage unit connected to said wheel motor-generator means for temporarily storing energy for said auxiliary propulsion, said motor-generator means replacing inertial energy by regenerative braking;
- means for controlling the auxiliary propulsion such that the acceleration profile of all vehicles leaving a particular station will be the same so that the speed at any point between two adjacent stations will be the same for all vehicles; and
- means for controlling the regenerative braking such that the deceleration profile of all vehicles arriving at a particular station will be the same so that the stopping point at the station will be the same for all vehicles.

9. A rapid transit system as set forth in claim 8 wherein the vehicle comprises means for keeping the car suspended from the monorail symmetrically away from the tunnel walls when the magnetic roll stabilization means is turned off and when its wheels are out of contact with the "fail-safe" rails regardless of passenger load and weight distribution, said means comprising:
- a track running transverse to the vehicle's longitudinal axis below the floor and midway between its ends;
- a counter-balance weight movable along the track; and
- a torque sensor that senses torque about the car's roll axis for controlling said movement along the track.

10. A rapid transit system as set forth in claim 1 wherein said vacuum tunnel is rigidly mounted within an outer tunnel having greater diameter;
- a plurality of stand-off rods that support the inner vacuum tunnel away from the walls of the outer tunnel;
- means for aligning the vacuum tunnel within the outer tunnel by adjusting the lengths of said stand-off rods;
- laser beam means for continuously monitoring the alignment of the vacuum tunnel by an alignment monitoring system that is outside the tunnel but connected to it; and
- means for evacuating and maintaining the inner vacuum tunnel to about $10^{-3}$ torr.

11. A system as set forth in claim 10 wherein the inner vacuum tunnel has a circular cross section and further comprising:
- support partition means extending longitudinally along the tunnel through its horizontal diameter;
- each of the two resulting corridors comprising an independent ferromagnetic suspension rail adjacent the top thereof, ferromagnetic guide rails adjacent the sides thereof, and "fail-safe" rails adjacent the bottom thereof so that vehicles can move independently of each other through each corridor in opposite directions at the same time.

12. A rapid transit system as set forth in claim 11 wherein each of said vehicles moving on upper level and lower level vaccum tunnel corridors is equipped with an escape system means by which passengers stranded between stations in a disabled vehicle can be safely rescued from it without having to pressurize the tunnel or without having to tow the train to the next station, said means comprising:
- a plurality of air-tight escape hatches mounted on the floor of each upper level vehicle and on the ceiling of each lower level vehicle and spaced apart so that when a lower level vehicle is directly below an upper level vehicle, the escape hatches on each side of the partition in each vehicle are opposite each other and not obstructed by the suspension rail of the lower level corridor or the "fail-safe" rails of the upper level corridor;
- a retractable, flexible tube mounted around each escape hatch for manual extension to engage and completely surround an opposite escape hatch to form an air-lock;
- means for allowing vehicle air into said air-lock for pressurizing it to atmospheric pressure;
- means for opening each escape hatch after the air-lock is pressurized from either vehicle so that passengers can be evacuated;
- whereby every upper level vehicle can be used to rescue passengers stranded in a disabled lower level vehicle between stations and every lower level vehicle can be used to rescue passengers stranded in a disabled upper level vehicle between stations.

13. A rapid transit system as set forth in claim 1 further comprising:
- a train of detachably coupled cars having pressure-tight doors;
- means for coupling each car in the train so that a constant car separation distance is maintained under compression or tension forces;
- a plurality of pressure-tight doors built into the tunnel walls at each station with equal separation distance such that when a train stops at a predetermined location in the station, all the cars doors are opposite station doors;
- air-tight retractable flanges built into the tunnel walls that surround each tunnel door for surrounding and engaging each car door, whereby the region bounded by the flanges, car door and tunnel door forms an air-lock;
- means for pressurizing the air-lock to atmospheric pressure;
- means for opening the car door and tunnel wall door after the air-lock has been pressurized to atmospheric pressure, allowing passenger transfer; and
- means for closing the car door and tunnel door and evacuating the air-lock before retracting said flanges.

14. A system as set forth in claim 13 further comprising:
- a plurality of positioning arms that flip up from the bottom of the tunnel at each station slightly ahead and slightly to the rear of each individual car in the train for accurately positioning each car in said train stopped at a station so that all its doors are opposite tunnel wall doors; and
- said positioning arms also serving as electrical connections to each car of the train to receive electrical power.

15. A system as set forth in claim 1 wherein the vehicle comprises a train of detachable coupled cars, each car having levitation magnets, guidance magnets and "fail-safe" wheels and capable of operating individually or as a train of several coupled cars.

16. A rapid transit system as set forth in claim 1 wherein the ferromagnetic suspension rail is a monorail in an upper portion of the tunnel, and further comprising means for switching a vehicle from one rail to a side rail at a tunnel intersection without physically contacting the tunnel or its rail system, said means comprising:
a pair of ferromagnetic high resistivity guide rails having a vertical section and a horizontal section extending along the length of the tunnels on each side of the suspension rail and parallel to it;
a plurality of servo-controlled guidance electromagnets located on each side of said vehicle for exerting outward lateral forces by attracting the vertical portion of the guide rail;
a plurality of servo-controlled guidance electromagnets located on ach side of said vehicle for exerting upward vertical forces by attracting the horizontal portions of the guide rail;
means for adjusting the power to the guidance electromagnets so that when the power to the guidance electromagnets on one side of a vehicle is terminated, the guidance electromagnets on the other side pulls the vehicle into the side tunnel adjacent the active guidance electromagnets and the resulting centrifugal force is balanced by the transverse force of the transverse guidance electromagnets, and the lift guidance electromagnets on the same side balance out the unbalanced torque due to the centrifugal force acting through the vehicle's center of mass and the transverse force of the transverse guidance electromagnets; and
gyro-stabilizer means in each vehicle for enabling the vehicle to follow a stable straight course when all guidance electromagnets are turned off.

17. A system as set forth in claim 1 wherein some of the levitation magnets attracting the ferromagnetic suspension rail are superconducting constant field strength magnets having a constant current flowing in them and others are servo-controlled electromagnets with variable current.

18. A system as set forth in claim 1 further comprising gap sensor means adjacent each electromagnet for servo-control thereof; and
stand-off rollers for preventing magnets and sensors of said vehicle from contacting the ferromagnetic rails in the event of magnet or servo-control system malfunction.

19. A rapid transit system as set forth in claim 1 wherein the vehicle comprises a train of detachably coupled cars; and wherein
each car includes flywheel alternator-motor energy storage units for supplying electrical power needed to operate systems in the car while it is moving between stations, and means for receiving electrical power to recharge said flywheel energy storage units from each station; and
each car in said train having electrical connections to the adjacent cars so that electrical current could be circulated throughout the entire train or concentrated to a particular car if needed.

20. A method of operating a rapid transit system having a tunnel extending between a pair of stations comprising the steps of:
maintaining a hard vacuum in the tunnel;
suspending a vehicle in the tunnel by attractive magnetic levitation so that no portion of the vehicle physically contacts any portion of the tunnel;
gravitationally accelerating the suspended vehicle down a descending portion of the tunnel whereby the vehicle's gravitational potential energy is converted to vehicle kinetic energy;
gravitationally decelerating the vehicle in an ascending portion of the tunnel whereby the vehicle's kinetic energy is converted to gravitational potential energy; and
establishing a plurality of air locks at each station through the vacuum tunnel to allow passage between a station and the interior of the vehicle when stopped at the station without removing the vehicle from the vacuum of the tunnel.

21. A method of operating a rapid transit system as defined in claim 20 further comprising mechanically accelerating the vehicle to a predetermined velocity prior to the gravitational acceleration step.

22. A method of operating a rapid transit system as defined in claim 21 further comprising:
braking the vehicle with a regenerative brake; and
storing the regenerative braking energy on board the vehicle.

23. A method of operating a rapid transit system as defined in claim 20 further comprising converting excess vehicle kinetic energy to flywheel inertial energy by regenerative braking at a relatively lower elevation station and converting flywheel inertial energy into additional vehicle kinetic energy by auxiliary propulsion means so that it can climb to a higher station elevation having higher gravitational potential energy.

24. A method of operating a rapid transit system as defined in claim 20 wherein the tunnel is divided into an upper semi-circular passage and a lower semi-circular passage comprising the additional step of:
moving vehicles through the upper and lower passages in opposite directions, said vehicles moving independently of each other.

25. A method of operating a rapid transit system as defined in claim 20 further comprising mechanically decelerating the vehicle as it approaches each station so that it comes to a stop at a predetermined point.

* * * * *

UNITED STATES PATENT AND TRADEMARK OFFICE
CERTIFICATE OF CORRECTION

PATENT NO. : 4,075,948

DATED : February 28, 1978

INVENTOR(S) : Michael A. Minovitch

It is certified that error appears in the above-identified patent and that said Letters Patent are hereby corrected as shown below:

Column 10, line 68, "$10^{316}$" should be -- $10^{-6}$ --.

Column 18, line 40, "cars" should be -- car --.

Signed and Sealed this

Eleventh Day of July 1978

[SEAL]

Attest:

RUTH C. MASON
Attesting Officer

DONALD W. BANNER
Commissioner of Patents and Trademarks